United States Patent
Enhager (12)

(10) Patent No.: US 6,240,090 B1
(45) Date of Patent: May 29, 2001

(54) SELF-CONFIGURING PROCESSORS IN AN ASYNCHRONOUS TRANSFER MODE SWITCH

(75) Inventor: Ulf C. L. Enhager, Haninge (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 0 days.

(21) Appl. No.: 09/067,034

(22) Filed: Apr. 28, 1998

Related U.S. Application Data

(60) Provisional application No. 60/068,098, filed on Dec. 19, 1997.

(51) Int. Cl.[7] ................................................. H04L 12/28

(52) U.S. Cl. ............................................................. 370/395

(58) Field of Search .................................... 370/254, 395, 370/351, 389, 396–400

(56) References Cited

U.S. PATENT DOCUMENTS

| | | | |
|---|---|---|---|
| 5,732,080 | * | 3/1998 | Ferguson et al. ..................... 370/392 |
| 5,740,171 | * | 4/1998 | Mazzola et al. ...................... 370/392 |
| 5,920,705 | * | 7/1999 | Lyon et al. ........................... 370/409 |
| 5,949,785 | * | 9/1999 | Beasley ................................ 370/398 |

FOREIGN PATENT DOCUMENTS 0 512 143   11/1992   (EP) .

OTHER PUBLICATIONS

*IEEE Communications Magazine*, vol. 31, No. 4, Apr. 1, 1993, pp. 46–52, XP000359823, pp. 48–50, "Distributed Control," M.A. Henrion et al., "A Multipath Self–Routing Switch".

*IEEE Journal on Selected Areas In Communications*, vol. 15, No. 5, Jun. 1997, pp. 830–843, XP000657036, H. Jonathan Chao et al., "Design and Implementation of Abacus Switch: A Scalable Multicast ATM Switch".

Globecom '95, *IEEE Global Telecommunications Conference*, Singapore, Nov. 14–16, 1995, vol. 3, Nov. 14, 1995, pp. 1967–197, XP000633631, Institute of Electrical and Electronics Engineers, Hari Lalgudi et al. "A Generic Software Platform For Local ATM Networking".

*IEEE Journal on Selected Areas In Communications*, vol. 9, No. 8, Oct. 1, 1991, pp. 1227–1238, XP000267574, Thomas C. Banwell et al., "Physical Design Issues for Very Large ATM Switching Systems".

\* cited by examiner

*Primary Examiner*—David R. Vincent
(74) *Attorney, Agent, or Firm*—Nixon & Vanderhye P.C.

(57) ABSTRACT

A self-configuring node includes a number of data processors associated with corresponding ports of an asynchronous transfer mode (ATM) switch. When the node is placed into service, each of the processors automatically broadcasts an initial message to all of the ATM switch ports including each processor's identification and ATM switch port location. After receiving the initial message broadcast by the processor, a designated master processor stores the broadcasting processor's identification and ATM switch port location in a database and sends an acknowledgment directed specifically to the processor broadcasting the initial message. From that received acknowledgment signal, the processor recognizes the identity and ATM switch location of the master processor. Internal Control Paths (ICPs) are established through the ATM switch between processors using the identification and location information stored for each board processor. The internal control paths are used to communicate control messages and other information between the processors. Thus, automatic configuration of a multiprocessor, ATM switch-based node is achieved without requiring polling of the processors by the master processor or involving a human operator.

32 Claims, 6 Drawing Sheets

SELF-CONFIGURING PROCESSORS IN AN ASYNCHRONOUS TRANSFER MODE SWITCH

RELATED APPLICATION

This application claims priority from U.S. Provisional Patent Application Serial No. 60/068,098, filed Dec. 19, 1997.

FIELD OF THE INVENTION

The present invention relates to multiple processor configurations, and more particularly, to configuring multiple processors in an Asynchronous Transfer Mode (ATM) switch.

SUMMARY AND BACKGROUND OF THE INVENTION

In the architecture of the present invention, plural Function Module Boards (FMBs) are connected to an asynchronous transfer mode (ATM) switch core. Each function module board contains one or more data processors, software including a distributed operating system and one or more application programs, and hardware circuitry including among other things an ATM switch port. The ATM switch core includes a number of Row-Column-Units (RCUs), and each ATM switch port is logically connected to one of the RCUs. When an FMB is connected to an ATM switch core slot, that logical connection is established. To coordinate the tasks performed at each one of the function modules, the distributed operating system is executed by the Board Processor(s) BP(s) in each function module. Signaling and traffic information are routed between various ones of the function modules through the ATM switch core. In order to effect such asynchronous communications, each function module needs to know the identity and the location of the other function modules connected to the ATM switch core. In particular, an internal connection or path needs to be established through the ATM switch core to effect selective interprocessor communication.

While such location and identity information and Internal Control Paths (ICPs) between processors could be established manually by a human operator, (using for example DIP switches contained on each function module board), it would be much less laborious and costly if these configuration tasks could be performed automatically. The invention therefore permits the board processors to adaptively self-configure themselves both during an initial start-up and whenever a new or a replacement function module board is to connected to the ATM switch core.

It is therefore an object of the present invention to provide automatic configuration of a plurality of processors associated with an ATM switch.

It is a further object of the present invention to automatically establish internal control paths between processors associated with an ATM switch.

It is a further object of the present invention to automatically configure new processors when they are associated with an ATM switch.

It is a further object of the present invention to automatically configure an array of processors associated with two or more ATM switches.

It is a further object of the present invention to automatically establish internal control paths between processors associated with different ones of the connected ATM switches.

A self-configuring node includes plural function module boards, each having one or more board processors and a corresponding ATM switch port, connected to available slots of an asynchronous transfer mode (ATM) switch. When the node is placed into service, each of the board processors automatically broadcasts an initial message to all of the ATM switch port locations. The initial message includes each board processor's identification and ATM switch port location.

One of the board processors functions as a master processor. After receiving the initial message broadcast by a board processor, the master processor stores that board processor's identification and ATM switch port location in a database and sends an acknowledgment directed specifically to the board processor broadcasting the initial message. From that acknowledgment signal, the board processor recognizes the identity and ATM switch port location of the master processor.

Internal control paths (ICPs) are then established through the ATM switch between processors using the identification and location information stored for each board processor. In a preferred embodiment, the ICPs are mutually established by the master processor and board processors with the master processor establishing one-half of the ICP and the board processor establishing the other half of the ICP. The internal control paths are used by the various board processors to selectively communicate control messages and other information. As an example of the latter, the master processor may download software to one or more of the board processors using the established internal control paths.

Thus, this first example embodiment of the invention permits automatic configuration of a multiprocessor, ATM switch-based node without requiring polling of the board processors by the master processor or human operator involvement in configuring the node. Basic configuration information stored for each board processor includes its identification and ATM switch port location. Other configuration information may also be stored.

In second example embodiment of the invention, a new is function module board is connected to a vacant slot of the ATM switch core, e.g., to add capacity and/or functionality to the node. When the new function module board is added, the board processor broadcasts automatically an initial message including its identification and ATM switch port location. The master board processor receives the initial broadcast message, stores the identification and ATM switch port location included in the message, and sends an acknowledgment. The master board processor and new board processor initially establish an internal control path through the ATM switch core between the new board processor and the master processor. The addition and automatic configuration of the newly-added board processor does not disrupt the operation of the already-configured board processors.

A third example embodiment of the present invention configures board processors in function modules connected to two or more ATM switch cores. For example, a physical link is established between first and second ATM switches through first and second exchange terminal boards (ETBs) connected to first and second ATM switch cores, respectively, i.e., an ETB interfaces to a physical line, e.g., twisted pair, coaxial cable, optical fiber, etc. The operation of each of the exchange terminal boards is controlled using a corresponding board processor. In the array of the board processors connected to the first and second ATM switches, one is designated the master processor, e.g., the master processor is connected to a port of the first ATM switch.

The master processor configures the board processors in both the first and second ATM switches. When each of the second board processors broadcasts its initial message to all of the ports of the second ATM switch, the second ETB, which functions as a pseudo-master processor, relays the information to the first ETB over the physical link. The first ETB "translates" that information and provides it to the master processor.

The master processor stores the translated information, and acknowledges the initial message from the broadcasting processor connected to the second ATM switch via the first and second ETBs and the physical link. In doing so, the master and board processors mutually establish internal control paths through the first and second ATM switches. Some of the internal control paths being routed over the physical link by way of the first and second ETBs. Thus, through the use of the physical link and the first and second ETBs, the board processors connected to the first and second ATM switch cores are automatically configured and effectively operated as if all the processors were connected to the same ATM switch core.

These and other objects and advantages of the present invention are described more fully below in conjunction with the drawings and the detailed description of the invention.

BRIEF DESCRIPTION OF THE DRAWINGS

The present invention is illustrated by way of example and not limitation in the accompanying figures in which like reference numerals indicate like elements and in which.

DETAILED DESCRIPTION OF THE DRAWINGS

In the following description, for purposes of explanation and not limitation, specific details are set forth, such as particular architectures, applications, interfaces, techniques, etc. in order to provide a thorough understanding of the present invention. However, it will be apparent to one skilled in the art that the present invention may be practiced in other embodiments that depart from these specific details. In other instances, detailed descriptions of well known methods, protocols, devices, and circuits are omitted so as not to obscure the description of the present invention with unnecessary detail.

The present invention finds particularly advantageous application to a mobile radio communications network having a plurality of stations or nodes constructed on an ATM-based platform. Such a mobile radio communications network is described in more detail in the related U.S. provisional patent application (attorney docket 2380-12), entitled "Asynchronous Transfer Mode Platform for Mobile Communications," Serial No. 60/068,097, filed Dec. 19, 1997, and filed as a regular U.S. patent application on Mar. 16, 1998, the disclosures of which are incorporated herein by reference.

Figure 1:
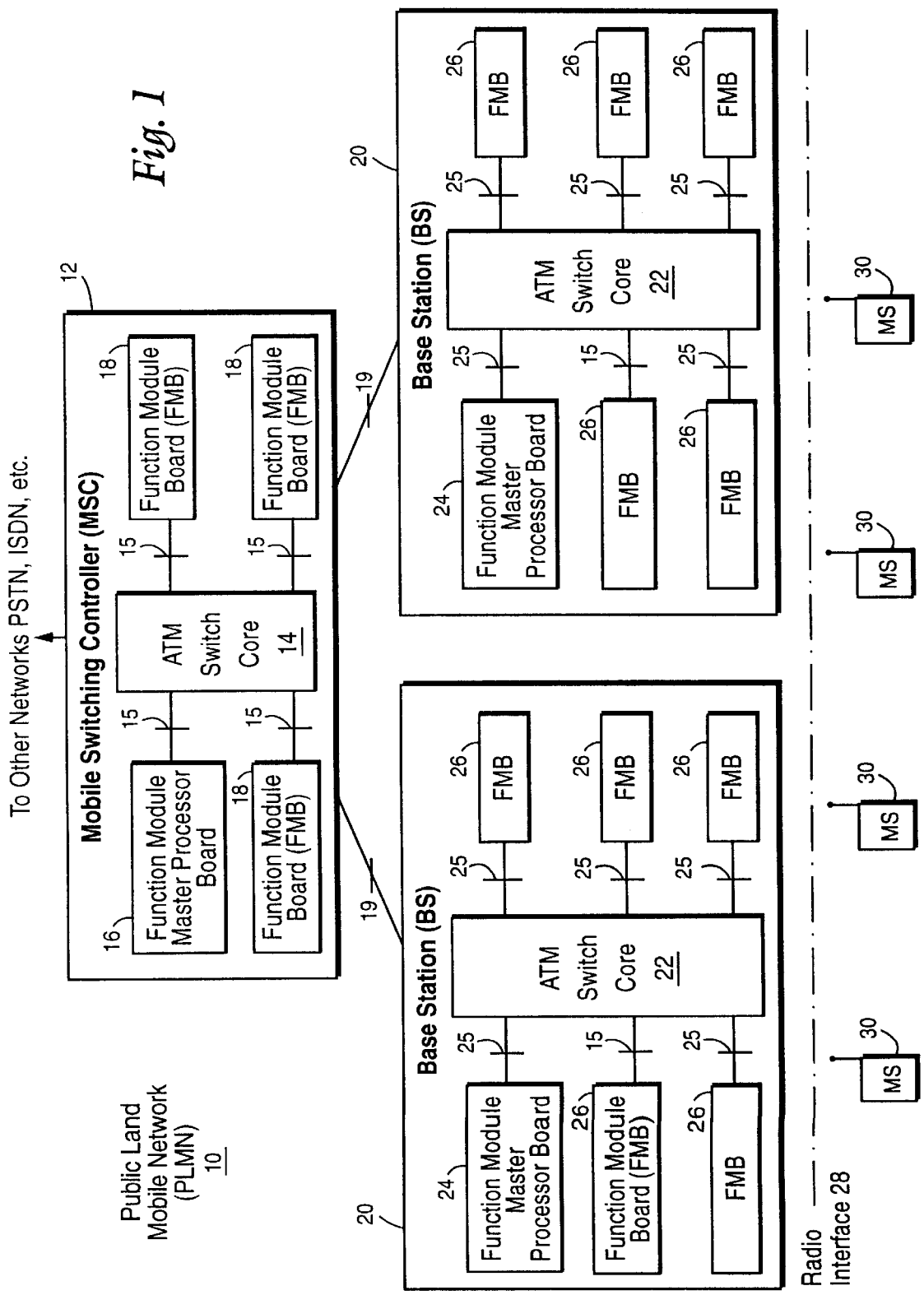
FIG. 1 illustrates a mobile radio telecommunications network in which the present invention may be advantageously applied.

For example, in the public land mobile network (PLMN) 10 shown in FIG. 1, three stations or nodes 12 and 20 are shown which are constructed on an ATM-based platform. A mobile switching controller (MSC) 12 interfaces the public land mobile network 10 with other fixed networks such as the public switched telephone network (PSTN), the integrated services digital network (ISDN), etc. The two base stations 20 interface the MSC 12 with the individual mobile stations 30 over a radio air interface 28.

Mobile switching controller 12 includes an ATM switch core 14. Attached to slots of the ATM switch core 14 are a plurality of function module boards (FMBs) including a master processor board (MPB) 16 and several board processors (BPs) 18. Each board processor includes memory for storing programs and data as well as data processing circuitry for processing data and executing the programs. The board processors communicate with each other and set up connections through the ATM switch core 14 using asynchronous transfer procedures over an ATM interface 15. In general, the mobile switching controller 12 sets up and controls all connections to and from mobile stations 30 as well as provides supplementary services. Given the mobility of mobile stations 30, the MSC 12 updates mobile subscriber data and mobile subscriber locations using appropriate databases (not shown). The MSC 12 also handles speech path continuity of mobile subscribers, sometimes referred to as "hand-over" or "hand-off."

The mobile switching controller 12 is connected to a plurality of base stations 20 (only two are shown for purposes of illustration), through a traffic and signaling interface 19. Each base station 20 includes an ATM switch core 22. A plurality of function module boards (FMBs) 26 are connected to ATM switch core 22 over ATM interface 25. Also connected to a slot each ATM switch core is a function module master processor board 24.

Figure 2:
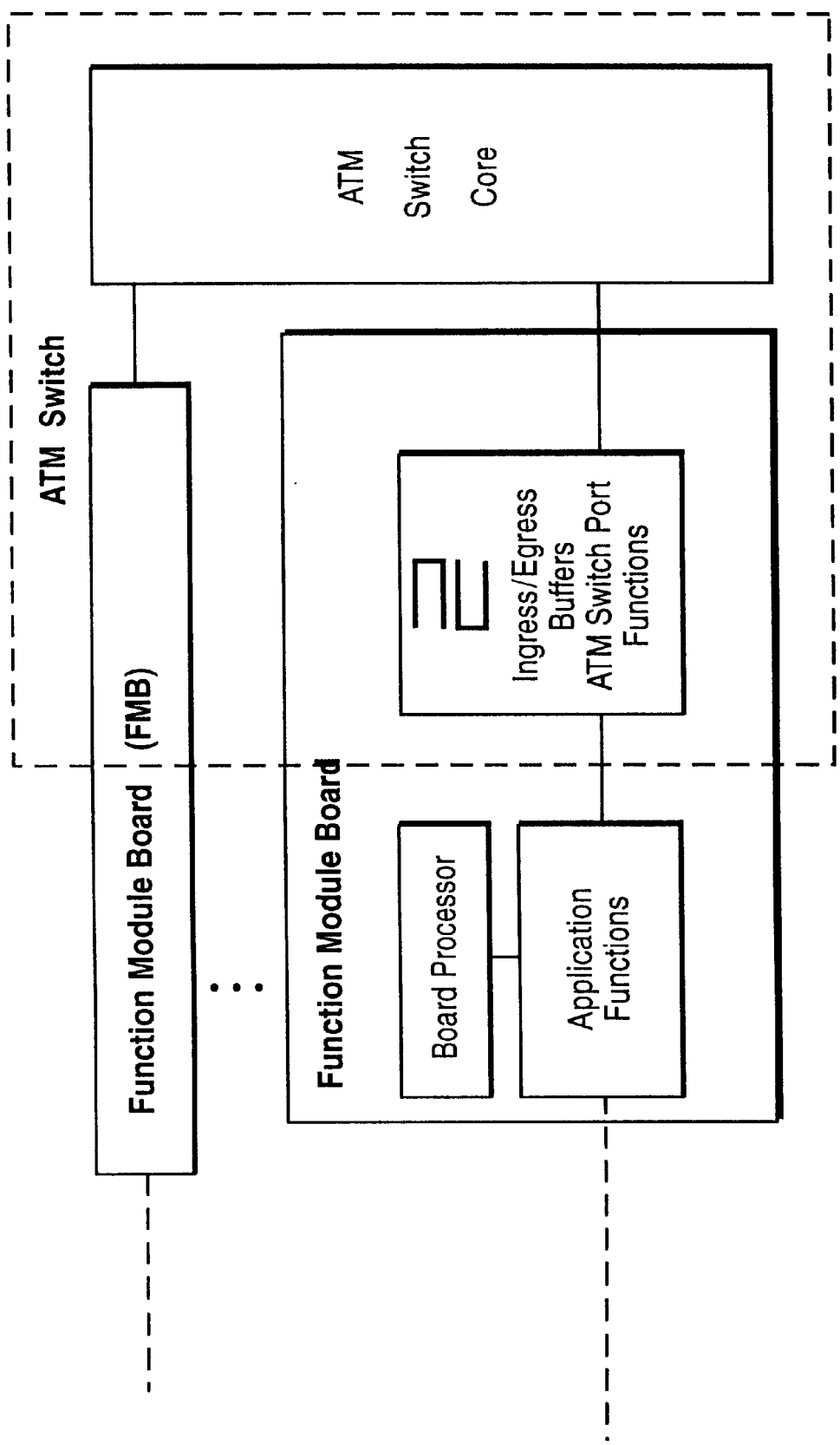
FIG. 2 is a function block diagram illustrating the ATM switch comprised of the ATM switch core and a portion of each attached function module board.

Referring to FIG. 2, each function module board (FMB) includes a data processor or group of data processors, memory, and dedicated hardware circuitry. Each FMB is connected to a slot of an ATM switch core. The ATM switch core consists of Row-Column-Units (RCUs) each associated with a slot, and ATM switch "ports" are logically associated with corresponding RCUs/slots. Accordingly, when a board processor is described as being connected or associated with an ATM switch port, that connection/association is to be understood as a logical connection/association. It is the FMBs that are physically connected to ATM switch core slots.

A portion of each function module board plus the ATM switch core makes up the ATM switch itself (shown in dashed lines). The portion of each function module board included in the ATM switch, which may be viewed as the ATM switch port, preferably includes dedicated data processing and storage hardware resources for performing ATM switch port functions such as ingress and egress buffering of ATM cells, encapsulating data, adding ATM headers and routing tags, VPI/VCI cell analysis and translation, etc. Such buffering, analysis, and translation are necessary to establish a route through the ATM switch core.

Connected between the ATM switch ports associated with each function module board are transmission paths or links. Each link includes a link circuit that performs packaging of cells according to the particular protocol in use on that link. Each link may carry cells for a plurality of connections. Paths internal to the ATM switch core are selectively controlled so that particular ports of the core are connected to allow a message to travel from an ingress side of the ATM switch to an egress side of the ATM switch. The queues or buffers shown in each function module board for each ATM switch port store cells prior to switching through the ATM switch core. The switch core, with its Row-Column-Units, essentially functions like a cross-connect between ports of the ATM switch.

In situations where cells may have one of a plurality of priority of classes, as they do for different qualities of service, each processor board may have a number of queues or buffers corresponding to the number of priority classes. Cells are fed into an appropriate buffer by an input queue selector, and are read out of the buffer at an appropriate time by an output queue selector. Of course, the specific details of the ATM switch core and protocol used in the present invention is not limited to a particular ATM architecture or ATM protocol.

Returning to FIG. 1, base stations 20 handle the radio interface to the mobile radio stations 30 and include radio equipment such as transceivers and antennas needed to serve one or more cells in the mobile radio network 10. Such functions may include radio transmission, radio signal reception from mobile stations including equalizing and diversity functions to compensate for fading effects; quality measurements for measuring signal strength and quality on uplink and downlink connections between the base station and mobile stations; timing and alignment measurements; base station radio transmitter power control and mobile station power control; multiplexing on the radio paths; channel coding, interleaving, broadcasting system information and paging messages; and receiving radio channel requests from mobile stations. Preferably, these functions are distributed and performed by various ones of the function module boards 26.

The public land mobile radio 10, being built upon an ATM platform, employs a connection-oriented ATM transmission protocol based on fixed length cells. The ATM protocol is asynchronous in the sense that cells containing information from an individual network user do not necessarily repeat at periodic intervals. Each ATM cell includes 53 bytes of which five bytes form an ATM cell header and 48 bytes convey the actual information provided for transmission, sometimes referred to as "the payload." Each ATM cell is associated with a given "virtual channel" or connection supported by a physical link. Each connection is identified by two subfields in the header: the virtual channel identifier (VCI) and the virtual path identifier (VPI). Together, these fields are used in multiplexing, demultiplexing, and switching a cell through the mobile radio network 10 for a particular connection. The VCI and VPI are not addresses. Rather, they are explicitly assigned in each ATM segment or link when a connection is established, and they remain for the duration of the connection.

When the ATM switch receives an incoming cell on an input port, it must determine which output port to route the cell based upon the incoming cell's VPI, VCI, and input port physical identifier. The ATM switch determines new VPI and VCI values to substitute into the cell header so that the cell is correctly routed to the next ATM networking segment. The ATM switch typically looks up this connection information in a VP/VC connection table based on the cell header's VPI and VCI information plus an additional "physical layer" information identifying the input ATM switch port.

The particular applications run on the board processors are isolated from the specific characteristics of the ATM protocol layer by an ATM adaptation layer (AAL). While the present invention is not limited to a specific ATM adaptation layer category or type, one preferred implementation uses AAL-5 for ATM connections between board processor modules attached to a single ATM switch core. AAL-5 is specifically tailored to carrying data traffic typically found in local area networks (LANs) and therefore finds good application to local, interprocessor communications. Any satisfactory ATM switch core and protocol topology may be used to implement an ATM platform in mobile network nodes such as the MSC 12 and base stations 20.

Figure 3:
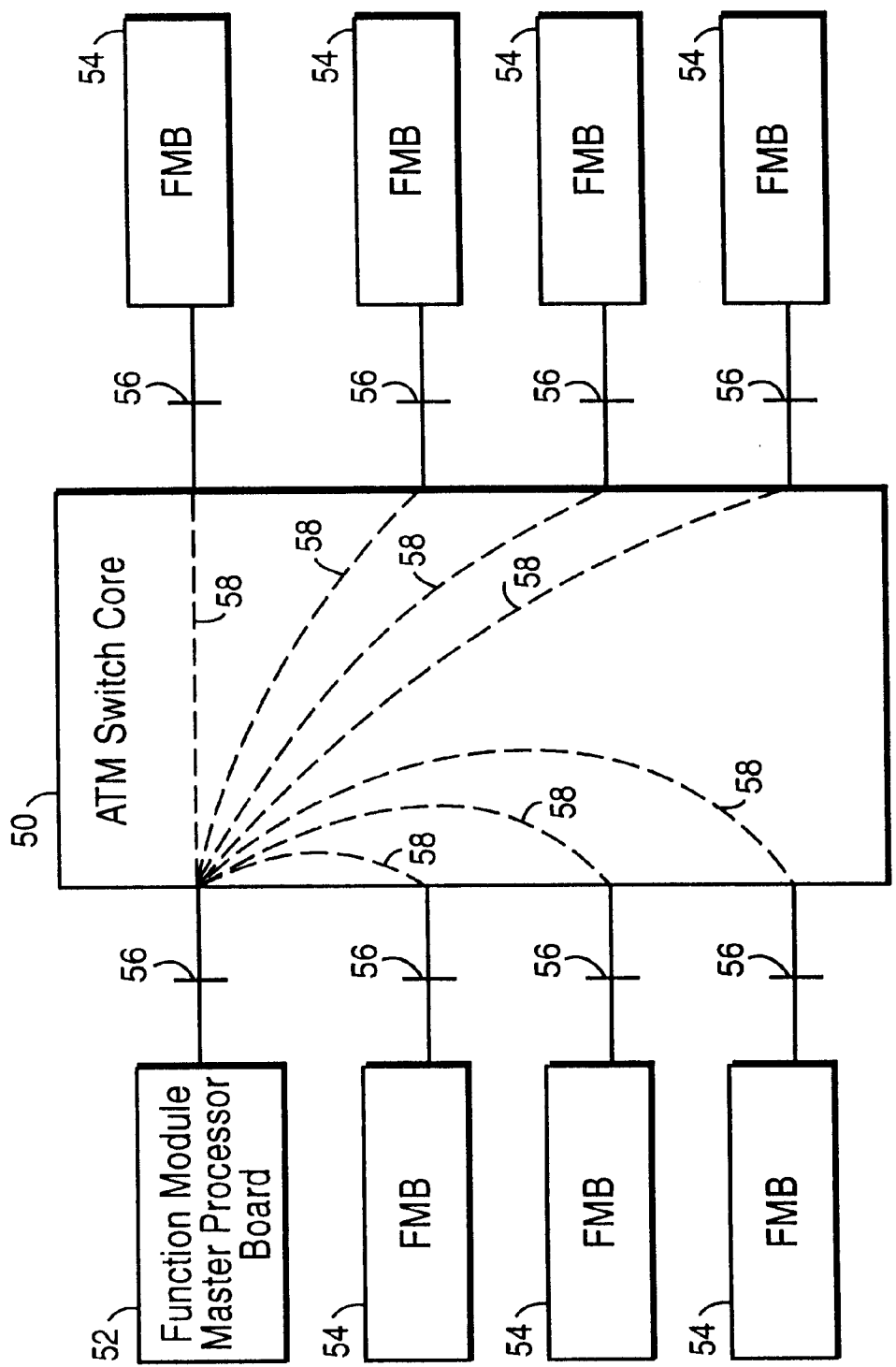
FIG. 3 is a function block diagram of a first example embodiment of the present invention.

While the present invention is advantageously applied in the mobile communications network 10 shown in FIG. 1, it has generic application as will be described in further detail in a general first embodiment shown in FIG. 3. FIG. 3 includes a single master processor board (MPB) 52 and plural function module boards (FMBs) 54 connected to respective slots of an ATM switch core 50. The master processor board 52 and FMBs 54 interface with the ATM switch core 50 over a suitable AAL interface such as AAL-5.

Communications between the master processor and the board processors are based on internal control paths (ICPs) through the ATM switch core 50. Example internal control paths 58 are shown as dashed lines through the ATM switch core 50. An internal control path is a general processor-to-processor control signaling connection. In the example embodiment, ICPs are provided to establish an initial, minimum topology referred to as a "star" topology where a single ICP connects the master processor to one of the board processors so that each board processor has its own ICP to the master processor. Of course, ICPs may be established automatically between all processors. Once appropriate application software is loaded on the processors, additional ICPs may be established between any of the board processors at the request of an application.

In the preferred example embodiment, each ICP is mutually established by the master processor and each board processor. The master processor establishes its own half of the ICP, and the board processor establishes the other half of the ICP.

To establish an internal control path, the master processor must know the identity of the board processor and the ATM switch port location at which the board processor is connected. Such internal control paths through the ATM switch core permit interprocessor communication without requiring separate bus structures or other signal lines connected the board processors. Moreover, the present invention advantageously establishes these internal control paths through the ATM switch core automatically and without requiring human operator intervention or polling of board processors by the master processor.

Figure 4:
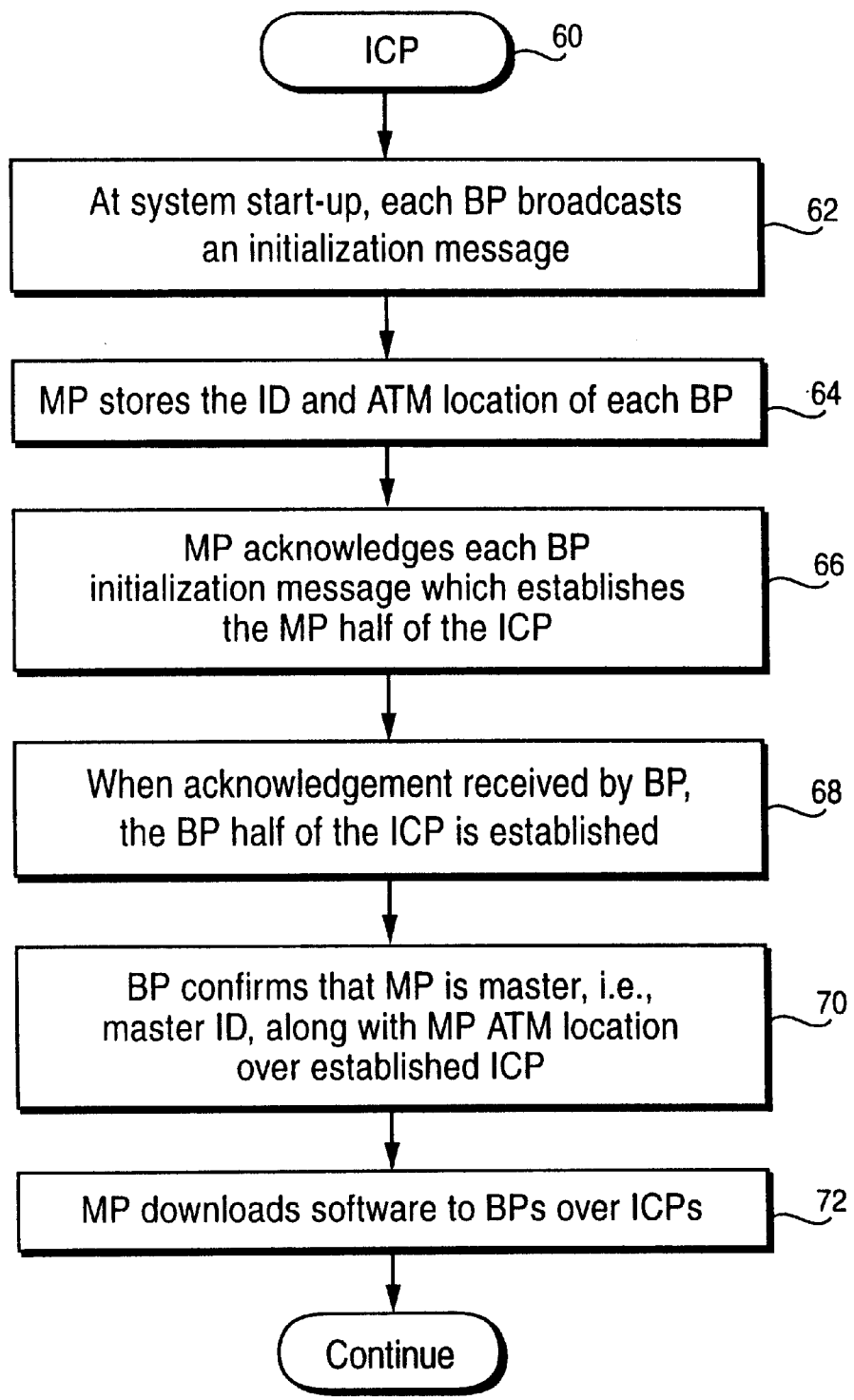
FIG. 4 is a flowchart diagram outlining an example self-configuration method in accordance with the first example embodiment.

Procedures for establishing internal control paths (ICPs) to configure various board processors for communication is now described in conjunction with the ICP routine (block 60) illustrated in flowchart format in FIG. 4. At system startup, e.g., power-up or after a reset, each of the board processors 54 broadcasts an initialization message (block 62). The initialization procedures may be stored in PROM on each FMB and include broadcasting an initialization message to all ATM switch ports connected to the same ATM switch core. The initialization message is sent periodically until an acknowledgment is received from the master processor.

Each initialization message includes configuration information for the broadcasting board processor including its identification and ATM switch port location. Other configuration information may include the FMB type, the specific version of the FMB type, the speed of the ATM switch port, the number of addressable devices on the FMB, the type of devices on the FMB, the identification and version of PROM'ed and loaded software, routable ATM addresses, etc. For example, the initialization message may include a virtual path identifier (VPI) and a virtual connection identifier (VCI) corresponding to the coded ATM switch port location which implicitly identifies the broadcasting board processor.

The master processor stores the identifier and ATM switch port location of each board processor based on the broadcast messages in a database or other memory table (block 64). Alternatively, the master processor may determine which board processor sent an initialization message via an explicit identification of the ATM switch port ID in the ATM cell payload. Only the master processor acknowledges each board processor's initialization message (block 66). The initialization message is ignored by the other board processors. The acknowledgment message establishes the master processor half of the ICP and also includes information which identifies the master processor and its ATM switch port location. Accordingly, when the acknowledgment message is received by the board processor, the board processor half of the ICP is established (block 68). That board processor sends a message directly back to the master processor confirming the identity and ATM switch port location of the master processor over the newly-established ICP (block 70). It is over these internal control paths that signaling and other types of control information are conveyed between the various processors connected to the ATM switch core. For example, the master processor may download software to the board processors over the established internal control paths (block 72).

In accordance with the inventive method, the processors connected to the ATM switch core are automatically configured for selective interprocessor communications through the ATM switch without the master processor polling the board processors. Nor are external signals over external bus structures required to effect such configuration or interprocessor communication.

Figure 5:
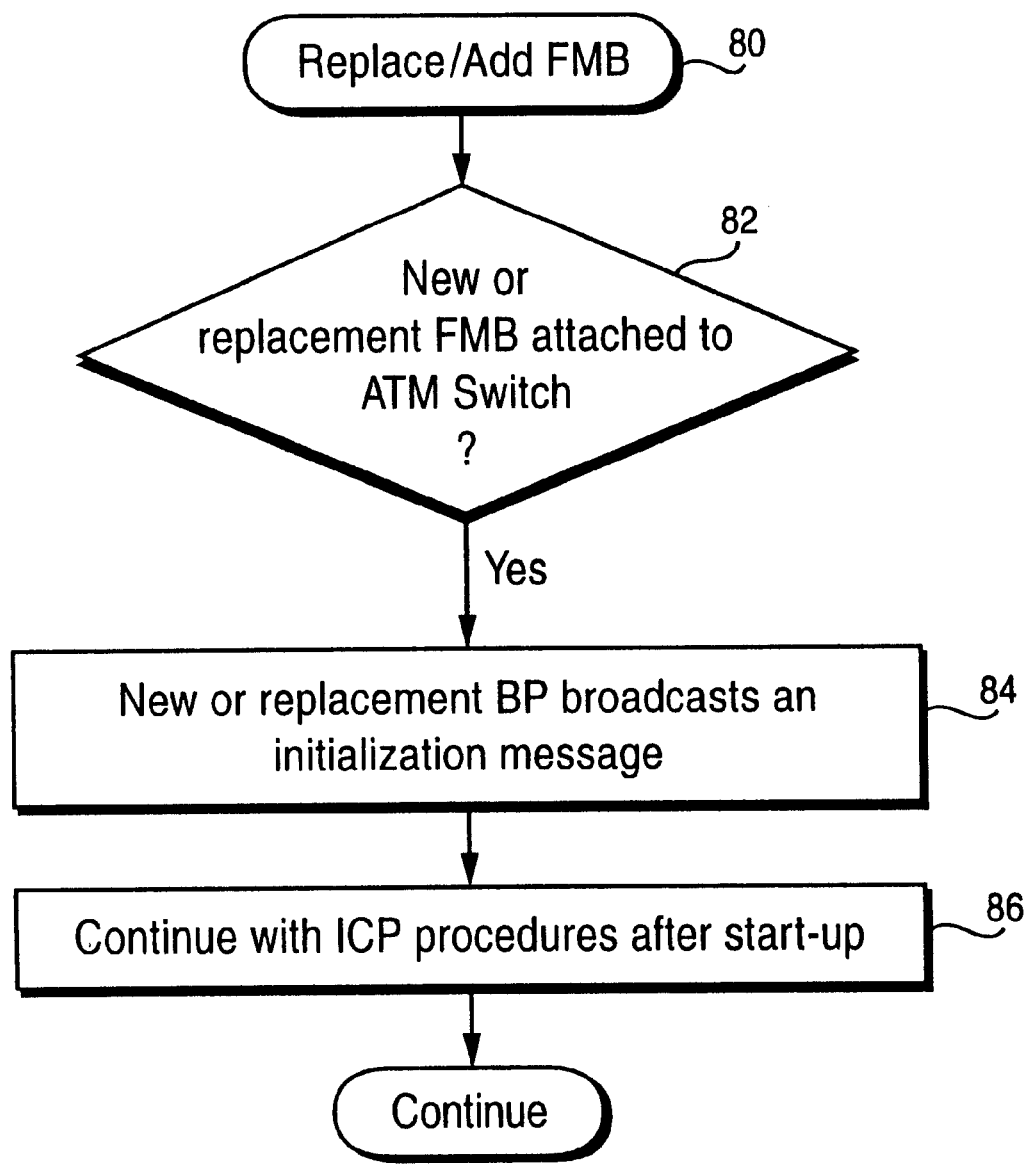
FIG. 5 is a flowchart diagram outlining an example method in accordance with a second example embodiment of the present invention.

A second example embodiment of the invention pertains to the modular replacement or addition of a function module board (FMB) to the ATM switch core without requiring elaborate reconfiguration of all the already-configured processors whose FMBs are already connected to the ATM function module switch core. Reference is made to the Replace/Add a routine (block 80) illustrated in flowchart format in FIG. 5. When a new or replacement function module is attached to the ATM switch core (block 82), the processor on the new or replacement function module automatically broadcasts an initialization message (block 84). As described above, the initialization message includes the processor's identification and ATM switch port location. Thereafter, the internal control path procedure set forth in FIG. 4 after system startup, i.e., blocks 64–72, is implemented to configure and establish an appropriate internal control path with the new or replacement function module as well as reconfigure the ATM switch (block 86).

Advantageously, the replacement or the addition of a new function module processor board does not disrupt operation of the already configured board processors. Usually, it is unacceptable in telecommunications systems to take equipment off-line for maintenance or other service. Moreover, if an operator initially installs a node capable of handling 200 simultaneous calls, it is advantageous to add additional boards "on the fly" without disturbing ongoing calls in order to upgrade the node to handle for example 400 simultaneous calls. In this second example embodiment of the present invention, growth and expansion are anticipated and easily accommodated without having to take the entire node off-line for repair, servicing, upgrading, or expansion.

Figure 6:
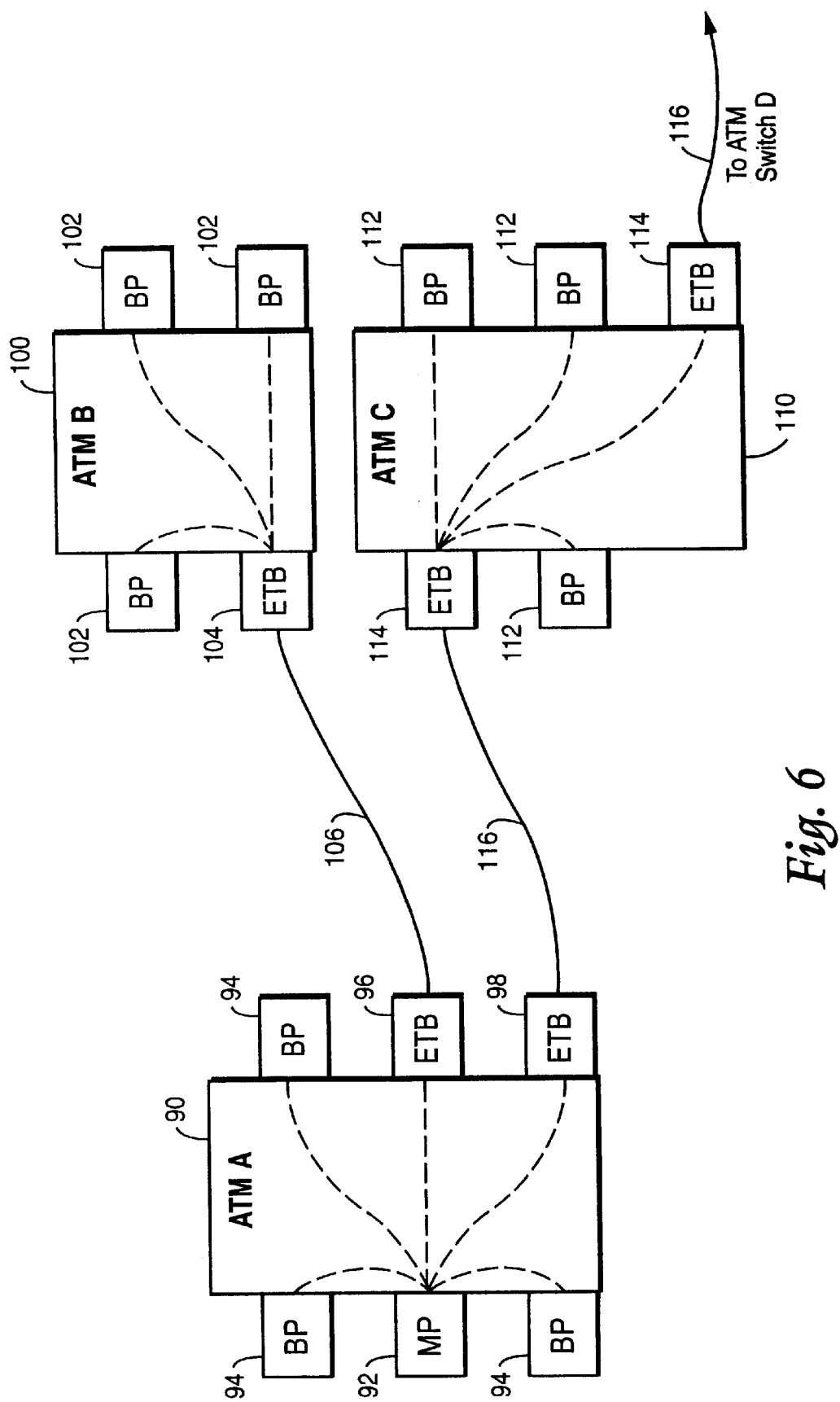
FIG. 6 is a function block diagram illustrating a third example embodiment of the present invention.

A third example embodiment of the present invention is now described in conjunction with the function block diagram shown in FIG. 6. There may be situations where two or more ATM switches are connected together. FIG. 6 shows for example three ATM switches 90, 100, and 110, labeled as ATM A, ATM B, and ATM C, respectively. Although it is understood that FMBs are physically connected to ATM switch core slots, for purposes of simplification, the following description refers to board processors (BPs) being associated with ATM switch ports. Hence, a number of board processors are associated with switching ports of each of the three ATM switches. ATM switch A, in particular, includes a master processor 92 associated with a switch port. In addition to other board processors 94, ATM switch A also includes exchange terminal board (ETB) processors 96 and 98. ATM switch B includes board processors 102 and an exchange terminal board processor 104. ATM switch C includes board processors 112 and an exchange terminal board processor 114.

Neither ATM switch B nor C is equipped with a master processor board. All of the processors shown in FIG. 6 are viewed and configured as an extended but unified processor network supervised and maintained by the master processor associated with ATM switch A.

The initial configuration of the processor network and establishment of internal control paths between board processors of ATM switches B and C is effected using exchange terminal board processors. A direct ATM communications link 106 is established between the ATM A exchange terminal board 96 and the ATM switch B exchange terminal board 104. Similarly, an ATM communications link 116 is established between ATM switch A exchange terminal board 98 and ATM switch C exchange terminal board 114. A third level of ATM switches is established for example via ETB 114 over ATM communications link 116 to an ATM switch D (not shown). Additional, cascaded levels may be added in similar fashion. Internal control paths are established between the master processor and other "A" ATM switch board processors through the ATM switch A (indicated by dashed lines) in accordance with the procedures described in FIGS. 3–5.

In order to configure the ATM switch B and the ATM switch C board processors in the extended board processor network shown in FIG. 6, a procedure for establishing ICPs for BPs at other ATM Switches "B" and "C" is now described. Similar procedures are followed to configure additional cascaded ATM switches. At system startup, the board processors associated with ATM switches B and C broadcast initialization messages to all ports on their respective ATM switches. These initialization messages include a processor identification and ATM switch port location. Since there is no master processor in ATM switches B and C, those initialization messages are not yet acknowledged. Because the master processor associated with ATM switch A has already configured the processor boards associated with ATM switch A, the master processor recognizes the exchange terminal boards 96 and 98 and loads VPI translation software.

After the "near-end" ETBs 96 and 98 (from the master processor's point of view) are recognized and loaded with pertinent software including VPI translation software, the master processor 92 sends a predefined message via the near-end ETBs 96 and 98 over corresponding direct ATM communications links 106 and 116 to "far-end" ETBs 104 and 114 (again from the master processor's point of view). The predefined message designates temporarily the ETBs 104 and 114 in the ATM switches 100 and 110 as pseudo-master processors. In particular, when a far-end ETB receives the predetermined message over the direct ATM communications link, that ETB is configured, (e.g., in PROM), to recognize itself as a pseudo-master processor for its corresponding ATM switch. Upon such recognition, each pseudo-master ETB relays all initialization messages from the board processors connected to its respective ATM switch over its ATM communications link towards the master processor's ATM switch.

When these initialization messages are received by the near-end ETBs 96 and 98, the VPI of each initialization message is translated or remapped to a new VPI uniquely associated with the corresponding near-end ETB in the first ATM switch 90. The VPI translation permits the master processor to recognize these initialization messages as originating from an ATM switch connected to a specific far-end ETB. As a result, each initialization message from a second level (or other additional level) ATM switch will have a unique VPI/VCI combination when it arrives at the master processor. The VPI indicates the specific ATM switch identity.

Since the master processor knows from the VPI where a specific initialization message originated, the first half of the internal control path (ICP) is established. An acknowledgment message is sent by the master processor to the appropriate near-end ETB by means of the newly-established ICP. That near-end ETB relays the acknowledgment message to the far-end ETB through the corresponding ATM communications link. The far-end ETB forwards the acknowledgment message to the correct board processor. The second half of the ICP is thereby established. The board processor sends a confirmation message to the master processor that it received information about the identity and ATM switch port location of the master processor. The confirmation message is sent using the established ICP to the master processor so that the far-end ETB no longer functions as a pseudo-master processor. During the initialization procedure, the board processors in the secondary and other level ATM switches are not aware that a pseudo-master processor was involved in the establishment of the ICP.

Thereafter, the master processor may download software to the various board processors at the different level ATM switches over the established internal control paths. If any new or replacement FMB is attached to any one of the ATM switches, the new or replacement board processor broadcasts an initialization message, and the board processor configuration and ICP setup procedures just described are performed.

Thus, the present invention permits a tremendous degree of flexibility and scalability for a single ATM switch-based node and for a multiple level network of ATM switch-based nodes. The initialization and configuration procedures to establish interprocessor communication occur automatically and are self-initiating on a per processor basis. As a result, those procedures may be applied to a very small system which uses only a single ATM switch with only a few connected board processors to an expansive network connecting several ATM switches via exchange terminal modules with each of the ATM switches having a large number of board processors.

While the invention has been described in connection with what is presently considered to be the most practical and preferred embodiments, it is to be understood that the invention is not to be limited to the disclosed embodiments. On the contrary, the present invention is intended to cover various modifications and equivalent arrangements included within the spirit and scope of the appended claims.

What is claimed is:

1. In a node including plural processors each associated with a corresponding port of an asynchronous transfer mode (ATM) switch, a method comprising the steps of:
   one of the processors automatically sending an initial message including the one processor's identification and ATM switch port location, and
   another of the processors receiving the initial message and sending an acknowledgment.

2. The method in claim 1, further comprising:
   the one processor sending a confirmation message to the other processor upon receiving the acknowledgment.

3. The method in claim 1, wherein the other processor is a master processor and the others of the processors are board processors, the method further comprising:
   each of the board processors automatically broadcasting an initial message including each processor's identification and ATM switch port location at an initial start up time, and
   only the master processor responding with an acknowledgment to each board processor's initial message broadcast.

4. The method in claim 3, further comprising:
   the master processor storing the identification and location of each board processor, and
   establishing internal control paths through the ATM switch over which the processors selectively communicate using the identification and location of each board processor.

5. The method in claim 4, further comprising:
   loading software from the master processor to each one of the board processors using the established internal control paths.

6. The method in claim 1, wherein the initial message is identified by a virtual path identifier (VPI) and a virtual connection identifier (VCI) corresponding to the one processor, wherein the VCI is associated with an ATM switch port location and the VPI is associated with an ATM switch.

7. The method in claim 1, wherein the acknowledgment includes an identifier identifying an ATM switch port location with which the other processor is associated.

8. The method in claim 1, further comprising:
   associating a new processor with a vacant port of the ATM switch;
   automatically sending an initial message from the new processor including the new processor's identification and ATM switch port location to the other processor;
   another of the processors receiving the initial message from the new processor and sending an acknowledgment; and
   establishing an internal control path through the ATM switch with the new processor.

9. The method in claim 8, wherein the new processor does not disrupt operation of the plural processors.

10. A system comprising:
    a first asynchronous transfer mode (ATM) switch core; and a first set of processor boards connected to the ATM switch core, each processor board having a processor associated with an ATM switch port location, wherein the processors automatically configure themselves to permit selective communication between the processors through the ATM switch core.

11. The system in claim 10, wherein one of the processors is a master processor and each remaining processor sends an initialization message that is received and acknowledged by the master processor.

12. The system in claim 11, wherein the initialization message includes an identification and ATM switch port location for each processor.

13. The system in claim 12, further comprising:

each of the processors broadcasting the initialization message to the other processors with only the master processor acknowledging each broadcast initialization message.

14. The system in claim 13, wherein the master processor stores identification and location of each board processor, and wherein internal control paths are established through the ATM switch core over which the master processor and remaining processors selectively communicate using the location and identification of each processor.

15. The system in claim 14, wherein the master processor loads software on each one of the board processors using the established internal control paths.

16. The system in claim 10, wherein the initialization message is identified by a virtual path identifier (VPI) and a virtual connection identifier (VCI) corresponding to the one processor, and wherein the VCI is associated with an ATM switch port location and the VPI is associated with an ATM switch.

17. The system in claim 10, wherein the acknowledgment includes an identifier identifying an ATM switch port location to which the other processor is connected.

18. The system in claim 11, further comprising:

a second ATM switch core to which a second set of processor boards is connected, wherein both the first and the second ATM switch cores are connected through respective exchange terminal boards (ETBs), and wherein the master processor stores the location and identification of each board processor and establishes internal control paths through the first and second ATM switch cores over which the master processor and the first and second sets of board processors selectively communicate using the identification and location of each board processor.

19. The system in claim 18, further comprising:

plural layers of ATM switch cores each having a set of processor boards connected through respective ETBs either directly to the first ATM switch ETB or to another ATM switch ETB, wherein the master processor stores the location identification of each board processor connected to each ATM switch and establishes internal control paths through ATM switch cores over which the master processor and each of the board processors connected to its respective ATM switch cores selectively communicate using the identification and location of each board processor.

20. In a communications network of plural nodes where first and second asynchronous transfer mode (ATM) switches each include plural processors associated with corresponding ports, a method comprising the steps of:

establishing a link between the first and second ATM switches through first and second extension modules connected to the first and second ATM switches, respectively, each of the extension modules including a corresponding processor, designating one of the processors associated with the first ATM switch as a master processor, and the master processor configuring the first and second processors associated with the first and second ATM switches, respectively.

21. The method in claim 20, the configuring step further comprising:

each of the second processors associated with the second ATM switch automatically sending over the established link an initial message including the each processor's identification and ATM switch port location to the master processor, and the master processor receiving each initial message and sending an acknowledgment over the established link to each of the second processors.

22. The method in claim 21, further comprising:

sending a confirmation message over the established link to the master processor upon receiving the acknowledgment at each of the second processors.

23. The method in claim 22, further comprising:

designating a processor on the second extension module as a temporary, pseudo-master processor for relaying the initial message from each of the second processors to the first extension module over the established link.

24. The method in claim 21, further comprising:

each of the second processors automatically broadcasting an initial message to the ports of the second ATM switch including each second processor's identification and ATM switch port location;

the first extension module receiving over the established link and translating the broadcast second ATM switch identifications and switch port locations into corresponding first ATM switch identifications and switch port locations.

25. The method in claim 24, further comprising:

the master processor responding with an acknowledgment to the first extension module;

the first extension module sending the acknowledgment over the established link; and the second extension module forwarding the acknowledgment to the second processors.

26. The method in claim 25, further comprising:

the master processor storing the location and identification of each of the first and second processors, and establishing internal control paths through the ATM switches between the first and second processors associated with the first and second ATM switches, respectively, over which the first and second processors selectively communicate, wherein some of the internal control paths are routed through the first and second extension modules.

27. The method in claim 26, further comprising:

loading software from the master processor to the second processors using the first and second extension modules.

28. The method in claim 21, further comprising:

associating a new second processor with a vacant port of the second ATM switch, automatically sending an initial message from the new second processor including the new processor's identification and ATM switch port location to the master processor over the established link using the first and second extension modules, and the master processor receiving the new second processor initial message and sending an acknowledgment using the first and second extension modules.

29. The method in claim 28, wherein the association of the new second processor with the vacant port does not disrupt operation of already-configured first and second processors.

30. An arrangement of plural processors associated with corresponding ports of an asynchronous transfer mode (ATM) switch, one of the processors being a master processor and the others of the processors being board processors, wherein the processors are automatically configured for selective interprocessor communications through the ATM switch without the master processor polling the board processors.

31. The arrangement in claim 30, wherein each of the board processors automatically broadcasts an initial message including each board processor's identification and ATM switch port location, each initial message to establish a part of an internal control path through the ATM switch over to each board processor.

32. The arrangement in claim 31, wherein each board processor uses an acknowledgment from the master processor to its initial message to establish a remaining part of the internal control path between the master processor and each board processor.

* * * * *